US009176237B2

(12) United States Patent
Yoshida et al.

(10) Patent No.: US 9,176,237 B2
(45) Date of Patent: Nov. 3, 2015

(54) COINCIDENCE DETERMINATION METHOD AND APPARATUS OF PET DEVICE

(71) Applicant: NATIONAL INSTITUTE OF RADIOLOGICAL SCIENCES, Chiba-shi, Chiba (JP)

(72) Inventors: Eiji Yoshida, Chiba (JP); Taiga Yamaya, Chiba (JP)

(73) Assignee: NATIONAL INSTITUTE OF RADIOLOGICAL SCIENCES, Chiba (JP)

( * ) Notice: Subject to any disclaimer, the term of this patent is extended or adjusted under 35 U.S.C. 154(b) by 147 days.

(21) Appl. No.: 13/846,443

(22) Filed: Mar. 18, 2013

(65) Prior Publication Data
US 2014/0061483 A1 Mar. 6, 2014

(30) Foreign Application Priority Data
Sep. 4, 2012 (JP) ................................. 2012-194133

(51) Int. Cl.
*G01T 1/164* (2006.01)
*G01T 1/29* (2006.01)

(52) U.S. Cl.
CPC .............. *G01T 1/164* (2013.01); *G01T 1/1647* (2013.01); *G01T 1/2985* (2013.01)

(58) Field of Classification Search
CPC ....................................................... G01T 1/164
See application file for complete search history.

(56) References Cited

U.S. PATENT DOCUMENTS

| 5,793,045 A * | 8/1998 | DiFilippo et al. ........ 250/363.03 |
| 2006/0102845 A1* | 5/2006 | Williams et al. ......... 250/363.03 |
| 2012/0316837 A1* | 12/2012 | Wang et al. .................... 702/187 |

FOREIGN PATENT DOCUMENTS

WO WO 2011/117990 A1 9/2011
WO WO 2011/125181 A1 10/2011

OTHER PUBLICATIONS

Dent at al., "A real time digital coincidence processor for positron emission tomography," *IEEE Transactions on Nuclear Science*, vol. 33, No. 1, pp. 556-559, 1986.
Newport at al., "Coincidence Detection and Selection in Positron Emission Tomography Using VLSI," *IEEE Transactions on Nuclear Science*, vol. 36, No. 1, pp. 1052-1055, 1989.
Yamamoto at al., "Investigation of single, random, and true counts from natural radioactivity in LSO-based clinical PET," *Annals of Nuclear Medicine*, vol. 19, No. 2, pp. 109-114, 2005.
Goertzen et al., "Imaging of Weak-Source Distributions in LSO-Based Small-Animal PET Scanners," *The Journal of Nuclear Medicine*, vol. 48, No. 10, 1692-1698, 2007.

(Continued)

*Primary Examiner* — Constantine Hannaher
(74) *Attorney, Agent, or Firm* — Oliff PLC

(57) ABSTRACT

In a coincidence determination of a PET device, the PET device uses a scintillator of radioactive isotope containing background noise due to intrinsic radioactivity as a radiation detector. The PET device counts a pair of annihilation radiations that is assumed to occur from a same nuclide. The annihilation radiations are detected within a predetermined coincidence time window by a plurality of radiation detectors. The method includes determining a coincidence with a wide energy window that allows detecting the background noise due to intrinsic radioactivity as multiple coincidences; removing the multiple coincidences; and using an energy window narrower than the wide energy window to limit a coincidence event to a coincidence event in a photopeak from a positron nuclide only.

13 Claims, 12 Drawing Sheets

(56) References Cited

OTHER PUBLICATIONS

Conti., "Effect of Randoms on Signal-to-Noise Ratio in TOF PET," *IEEE Transactions on Nuclear Science*, vol. 53, No. 3 pp. 1188-1193, 2006.

Kimdon et al., "Effect of Random and Scatter Fractions in Variance Reduction using Time-of-Flight Information," *Nuclear Science Symposium Conference Record*, 2003 IEEE, vol. 4, pp. 2571-2573, 2003.

Watson at al., "NEMA NU 2 Performance Tests for Scanners with Intrinsic Radioactivity," *The Journal of Nuclear Medicine*, vol. 45, No. 5, pp. 822-826, 2004.

* cited by examiner

RANDOM COINCIDENCE

SCATTER COINCIDENCE

Fig. 8C    PRESENT INVENTION

WIDE ENERGY WINDOW AT FIRST PHASE

NARROWER ENERGY WINDOW AT SECOND PHASE

COINCIDENCE DETERMINATION METHOD AND APPARATUS OF PET DEVICE

CROSS-REFERENCE TO RELATED APPLICATION

This application claims priority from Japanese Patent Application No. 2012-194133 filed with the Japan Patent Office on Sep. 4, 2012, the entire content of which is hereby incorporated by reference.

BACKGROUND

1. Technical Field

The present invention relates to a coincidence determination method and an apparatus of a PET device. Especially, the present invention relates to a coincidence determination method and an apparatus of a PET device that are preferred to be used for a PET device that employs a scintillator containing an Lu radioactive isotope as a radiation detector, and that remove background noise due to intrinsic radioactivity.

2. Related Art

A coincidence determination method (see H. M. Dent, W. F. Jones, and M. E. Casey, "A real time digital coincidence processor for positron emission tomography", IEEE Trans. Nucl. Sci. Vol. 33, 556-559, 1986, and D. F. Newport, H. M. Dent, M. E. Casey, and D. W. Bouldin, "Coincidence Detection and Selection in Positron Emission Tomography Using VLSI", IEEE Trans. Nucl. Sci. Vol. 36, 1052-1055, 1989) used in a PET device is, as illustrated in FIG. 1, a detection method that estimate a pair of annihilation radiations 14a and 14b detected within an extremely short period of approximately several nanoseconds as true coincidence generated from the same positron nuclide 12. In FIG. 1, 10 denotes an inspection target such as a patient; 20 denotes a detector ring (hereinafter, also referred to simply as a ring) where a plurality of radiation detectors (hereinafter, also referred to simply as detectors) 22 that constitutes the PET device are arranged, for example, on its circumference; 24 denotes circuits that detect detected positions and time information of radiations in the respective detectors 22; 26 denotes a coincidence circuit that determines a coincidence to be present if a difference in detection time between the plurality of detectors 22 falls within a predetermined coincidence time width (hereinafter, also referred to as coincidence time window); and 28 denotes a data collecting unit that collects and stores coincidence data.

The coincidence time window for determining a positron nuclide is determined by the timing resolution and the size of the field of view of the PET device. At present, PET devices with an improved timing resolution of around 500 picoseconds have been developed. The coincidence time window is also limited by the locations of positron nuclides and the ring diameter of the detector ring. A coincidence time window equal to or less than around four nanoseconds will confine the imaging field of view of existing clinical PET devices.

The coincidence method performs a positron nuclide determination in a finite time. A random coincidence as exemplarily illustrated in FIG. 2A that simultaneously detects annihilation radiations from different positron nuclides, and a scatter coincidence as exemplarily illustrated in FIG. 2B occur in addition to a true coincidence illustrated in FIG. 1.

Regarding this coincidence determination method, the applicant proposes several methods (see WO2011/117990 and WO2011/125181).

On the other hand, in a general PET device, since high timing resolution and similar performance results in good overall performance balance, a scintillator (LSO, LYSO, or LGSO) containing Lu radioactive isotope is employed. The Lu radioactive isotope of Lu-176 undergoes, as illustrated in FIG. 3, beta decay and emits a beta particle at a mean energy of 420 keV, and then emits three gamma rays at 307 keV, 202 keV, and 88 keV and becomes Hf-176. Accordingly, the PET device that employs the scintillator containing the Lu radioactive isotope contains background noise (which is referred to as intrinsic radioactivity) caused by Lu-176.

However, in measurement for a general clinical PET, this noise due to intrinsic radioactivity is negligible (see S. Yamamoto, H. Horii, M. Hurutani, et al., Ann. Nucl. Med., Vol. 19, 109-114, 2005). On the other hand, when imaging a positron nuclide at a low activity level, degradation in image quality due to artifact caused by a noise component of Lu-176 has been reported (A. L. Goertzen, J. Y. Suk, C. J. Tompson, J. Nucl. Med., Vol. 48, 1692-1698, 2007).

In particle radiotherapy, monitoring whether irradiation is correctly performed as planned by applying a principle of PET, what is called in-beam PET, also has noise due to intrinsic radioactivity as an obstacle for imaging the positron nuclide at the low activity level generated by irradiation with heavy particles.

On the other hand, in a PET device with very high timing resolution, information on time-of-flight (hereinafter, abbreviated as TOF) of a pair of annihilation radiations is used for limiting a position on a line of response (LOR) to improve sensitivity of the device. Such TOF-PET device has been developed.

Nowadays, a TOF-PET device using LSO has been put into practical use. In this TOF-PET device, the LOR is locally written. Thus, this not only reduces noise diffusion to improve SIN ratio of an image, but also contributes to reduction in random coincidence. This effect has been reported (see M. Conti, IEEE Trans. Nucl. Sci., vol. 53, 1188-1193, 2006, and J. A. Kimdon, J. Qi, and W. W. Moses, Nuclear Science Symposium Conference Record, 2003 IEEE, vol. 4, 2571-2573, 2003).

This TOF-PET device intrinsically removes the random coincidence, and has an effect on removal of background noise of Lu-176. This TOF-PET device has considerably high performance while the TOF-PET device is expensive. At this time, this device is not implemented to every PET device.

A general method for removing background noise of the scintillator containing Lu-176 is to narrow an energy window so as to focus only on a photopeak of the positron nuclide (see Watson CC, et al., 2004. J. Nucl. Med. 45(5):822-826, and S. Yamamoto, H. Horii, M. Hurutani, et al., Ann. Nucl. Med., Vol. 19, 109-114, 2005). Using sufficiently narrow energy window in the existing PET device does not have any problem of influence of background noise in clinical use.

However, even if the energy window is narrowed, it is not possible to remove a background component that causes a random coincidence. Accordingly, a problem arises in that this degrades image quality in measurement for radioactive concentration at a low activity level.

The present invention has been made to solve the existing problem, and it is an object of the present invention to effectively reduce background noise due to intrinsic radioactivity in the case where a scintillator containing the Lu radioactive isotope is used.

Most beta particles from Lu-176 are assumed to be detected inside the detector. As exemplarily illustrated in FIG. 4A, a case where the beta particle and the gamma ray cause a coincidence (Intrinsic True: IT), and as exemplarily illustrated in FIG. 4B, a case where the beta particles cause a random coincidence (Intrinsic Random: IR) are assumed. A ratio of count of these noise components significantly depends on a size of the PET device, the energy window, and the coincidence time window.

While IR is considered to be mainly counted as a coincidence of the beta particles, IR always accompanies the gamma rays. These gamma rays are not detected under an optimal energy window while the gamma rays are detected as Multiple Coincidences (MC) under a very wide energy window. That is, Lu-176 emits, as illustrated in FIG. 3, three gamma rays and a beta particle. Thus, in the case where radiation from Lu-176 in different positions of occurrence cause a random coincidence, a lower limit value of the energy window is decreased so as to detect a gamma ray from Lu-176. This allows high probability of multiple coincidences. On the other hand, in the PET measurement at a low activity level, multiple coincidences caused by the inspection target hardly occurs.

Current PET devices usually have implemented list mode data collection that collects a coincidence event in time order. To list mode data, not only an address of LOR but also TOF information, energy information, and similar information can be added. Accordingly, data reprocessing such as changing the energy window after collection is possible.

Therefore, also in an LSO-PET device without TOF detectability, after measurement with a very wide energy window, multiple coincidences are removed. Subsequently, the event is removed again using the existing energy window, which is considered to reduce IR.

SUMMARY

The present invention has been achieved in view of this point. The present invention solves the aforementioned problem as follows. In a coincidence determination method of a PET device, the PET device is configured to use a scintillator of radioactive isotope containing background noise due to intrinsic radioactivity as a radiation detector and count a pair of annihilation radiations that is assumed to occur from a same nuclide. The annihilation radiations are detected within a predetermined coincidence time window by a plurality of radiation detectors. The method includes: determining a coincidence with a wide energy window that allows detecting the background noise due to intrinsic radioactivity as multiple coincidences; removing the multiple coincidences; and using an energy window narrower than the wide energy window to limit a coincidence event to a coincidence event in a photopeak from a positron nuclide only.

The present invention also solves the aforementioned problem using a coincidence determination apparatus of a PET device. The coincidence determination apparatus of the PET device includes a PET device, a determination unit, a removal unit, and a limiting unit. The PET device is configured to use a scintillator of radioactive isotope containing background noise due to intrinsic radioactivity as a radiation detector. The determination unit is configured to determine a coincidence with a wide energy window. The energy window allows detecting the background noise due to intrinsic radioactivity as multiple coincidences when pairs of annihilation radiations assumed to occur from a same nuclide are counted. The annihilation radiations are detected within a predetermined coincidence time window by a plurality of radiation detectors. The removal unit is configured to remove the multiple coincidences. The limiting unit is configured to use an energy window narrower than the wide energy window to limit a coincidence event to a coincidence event in a photopeak from a positron nuclide only.

Here, the scintillator may be a scintillator that contains Lu radioactive isotope.

Additionally, the wide energy window may be an on-line window, and the narrower energy window may be an off-line window.

Additionally, the narrower energy window may be within an energy distribution at a photopeak.

Additionally, the wide energy window may have a lower limit value and an upper limit value that can be sensed by the detector.

Additionally, a process with the wide energy window and a process with the narrower energy window may be performed on the same list mode data.

The present invention suppresses a background component that causes a random coincidence. This background component cannot be removed by narrowing the energy window at an initial state so as to focus only on a photopeak of a positron nuclide. Therefore, especially, the present invention effectively reduces background noise due to intrinsic radioactivity in the case where the scintillator containing Lu radioactive isotope is employed, and improves image quality for PET measurement at a low activity level. Alternatively, a setting value of the energy window is simply varied. Thus, the present invention is applicable to the existing PET device.

BRIEF DESCRIPTION OF DRAWINGS

The foregoing and additional features and characteristics of the present invention will become more apparent from the following detailed description considered with the reference to the accompanying drawings, wherein:

FIGS. 8A to 8C are diagrams illustrating an action according to the first embodiment of the present invention;

DETAILED DESCRIPTION

Hereinafter, embodiments of the present invention will be described in detail with reference to the drawings.

Figure 1:
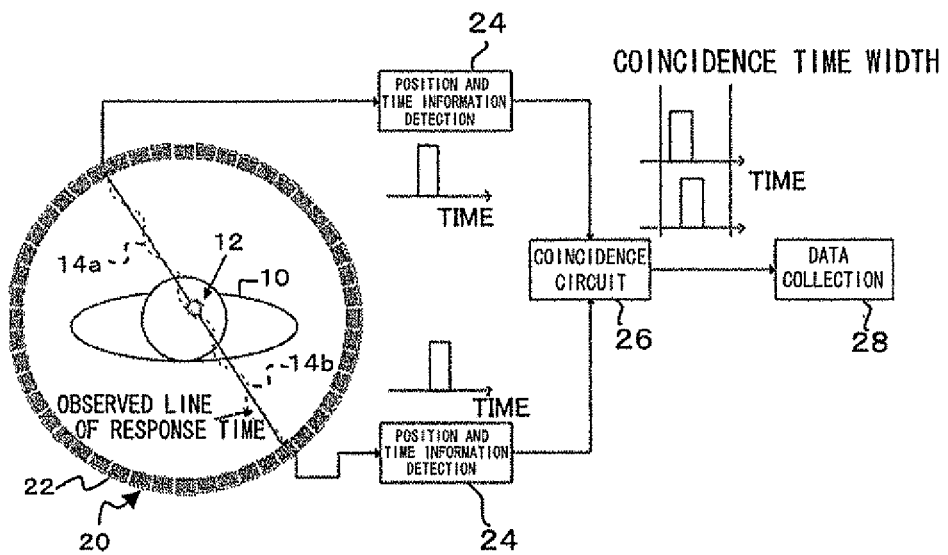
FIG. 1 is a block diagram illustrating an existing coincidence determination method.
Figure 2A:
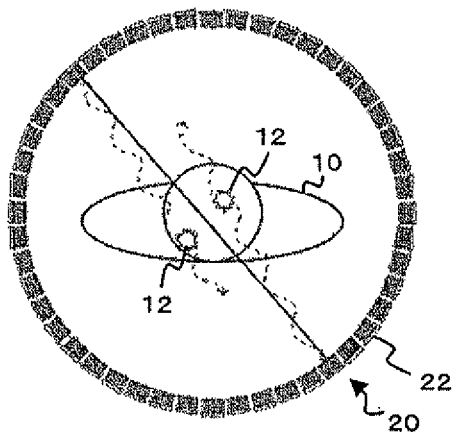
FIG. 2A is a diagram illustrating an example of a random coincidence.
Figure 2B:
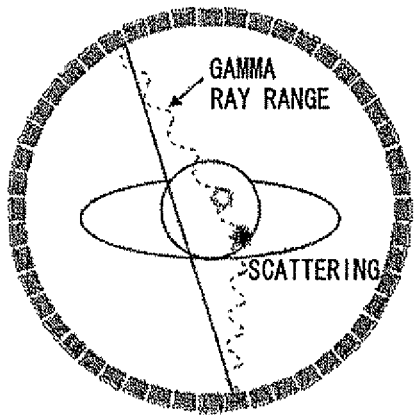
FIG. 2B is a diagram illustrating an example of a scatter coincidence.
Figure 3:
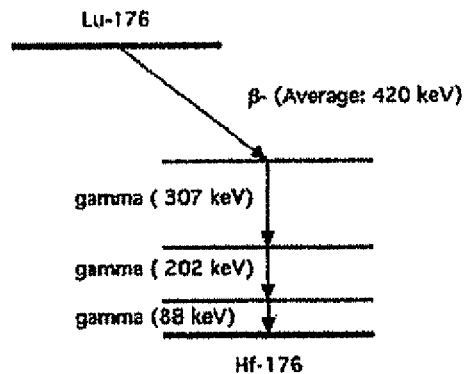
FIG. 3 is a diagram illustrating a decay mode of Lu-176.
Figure 4A:
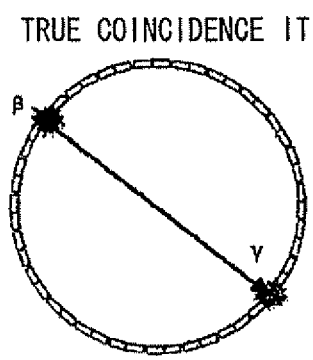
FIG. 4A is a diagram illustrating Lu-176 in the case of IT where a beta particle and a gamma ray cause a coincidence.
Figure 4B:
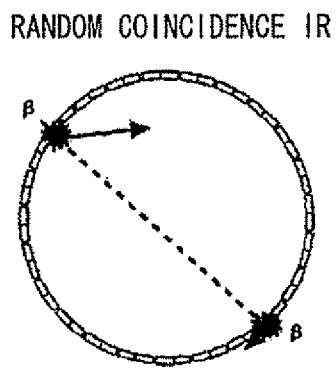
FIG. 4B is a diagram illustrating Lu-176 in the case of IR where beta particles cause a random coincidence.
Figure 5:
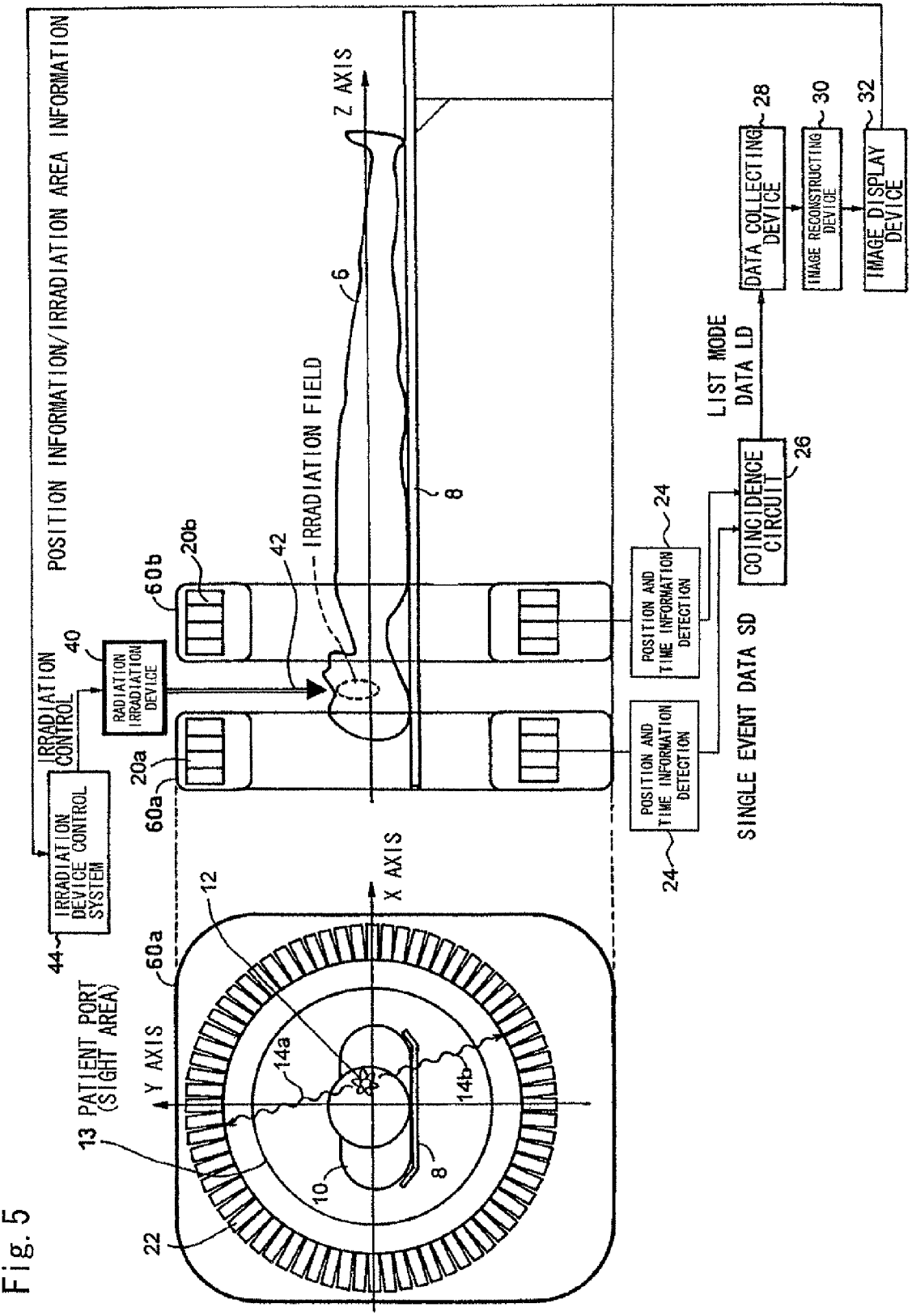
FIG. 5 is a block diagram illustrating an overall configuration of an embodiment according to the present invention.

An embodiment of the present invention where an open PET device is applied to beam monitoring of radiotherapy will be described. FIG. 5 illustrates a configuration of an embodiment. In this embodiment, two ring-shaped identical detector rings 20a and 20b are arranged parallel to each other as independent gantries (60a, 60b). Subsequently, a radiation irradiation device 40 is inserted into a space between the detector rings 20a and 20b. Thus, therapy monitoring where the same treated part is checked by PET immediately after treatment is achieved.

Specifically, the embodiment includes detector rings 20a and 20b that form a sight area of a patient port 13, gantry covers 60a and 60b which cover the respective detector rings 20a and 20b, and a bed 8 on which a patient 10 lies.

A therapy beam 42 emitted from the radiation irradiation device 40 passes through the spatial gap area between the detector rings 20a and 20b, and the irradiation field of the patient 10 is irradiated without interfering with the PET gantries (60a, 60b).

In FIG. 5, the radiation irradiation device 40 and the PET device are controlled by an irradiation device control system 44 into which an irradiation plan program is input. The irradiation device control system 44 includes an irradiation position setting unit for setting the irradiation position of the radiation and a radiation irradiating unit for irradiating the irradiation position of the radiation with an irradiation beam.

The irradiation position setting unit, which controls an electromagnet, a collimator, a scatterer, a ridge filter, a slit, and a similar member sets an irradiation position in the irradiation field. The radiation irradiating unit, which performs irradiation of an X-ray or a gamma ray, irradiates a set position with a beam in a predetermined shape.

The PET device measures radiation generated from the vicinity of the affected area by its irradiation, and reconfigures a PET image based on the collected data. The obtained PET image is fed back to the irradiation device control system 44 and used for positioning the irradiation field, checking the effect of the treatment, and modifying the treatment plan.

Next, a method for processing the measured data will be described. A nuclide 12 in the body of the patient 10 emits a pair of annihilation radiations 14a and 14b which travel at angles of approximately 180° from each other in all directions. In the detector rings 20a and 20b, single event data SD is the measured data on either one of the pair of annihilation radiations 14a and 14b obtained by either one of the position and time information detection circuits 24. The single event data SD is transmitted to the common coincidence circuit 26, and is converted into list mode data LD, which is information on the coincidence pair between the detector rings 20a and 20b.

This list mode data LD is stored in a recording medium by a data collecting device 28, and then is transmitted to an image reconstructing device 30 for image reconstruction operation. Subsequently, the reconstructed image is displayed by an image display device 32.

Hereinafter, by referring to FIG. 6, which illustrates a basic procedure according to the present invention, and FIG. 7, which illustrates a specific procedure according to a first embodiment, a procedure according to the present invention will be described.

Figure 6:
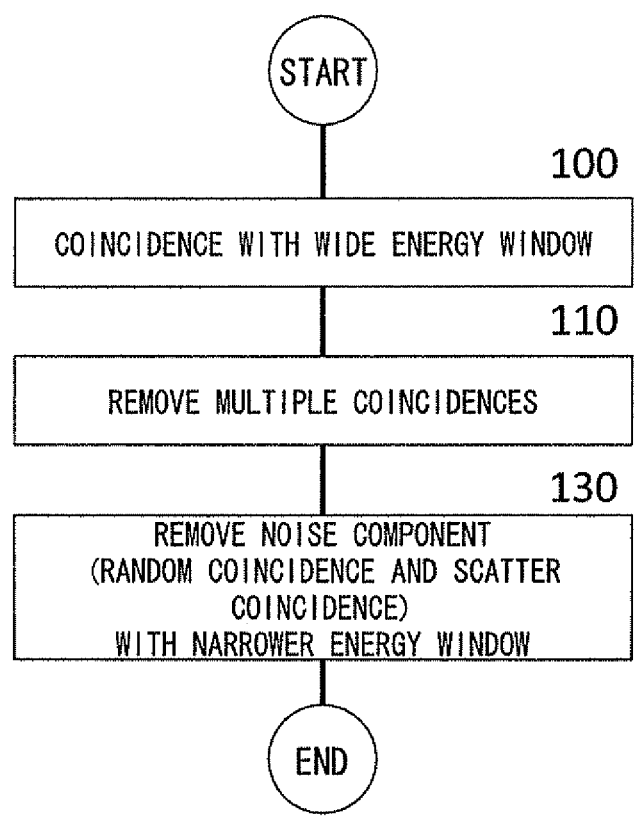
FIG. 6 is a flowchart illustrating a basic procedure according to the present invention.
Figure 7:
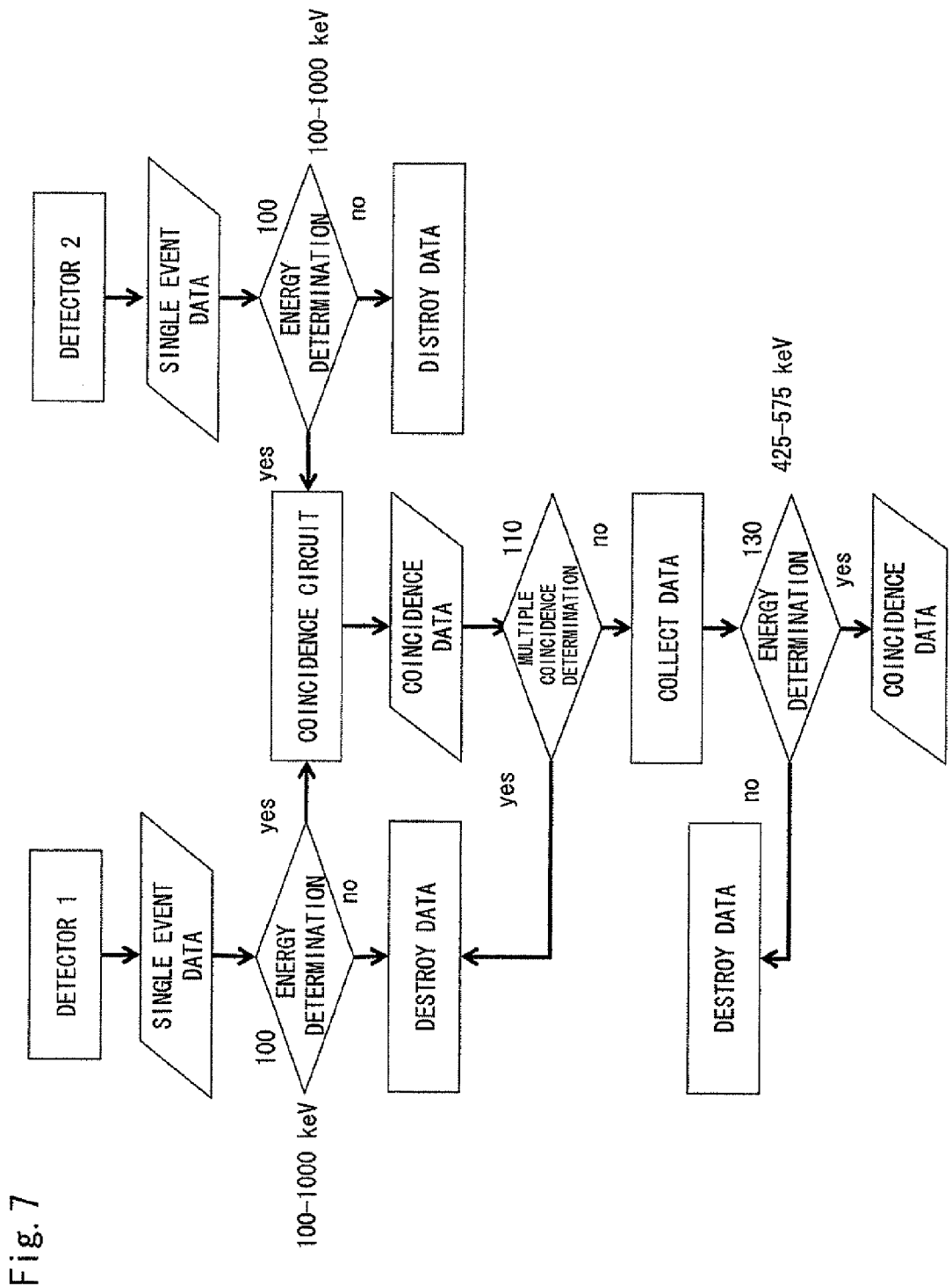
FIG. 7 is a flowchart illustrating a specific procedure according to a first embodiment of the present invention.
Figure 8A:
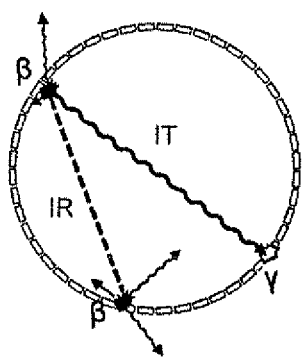
Figure 9A:
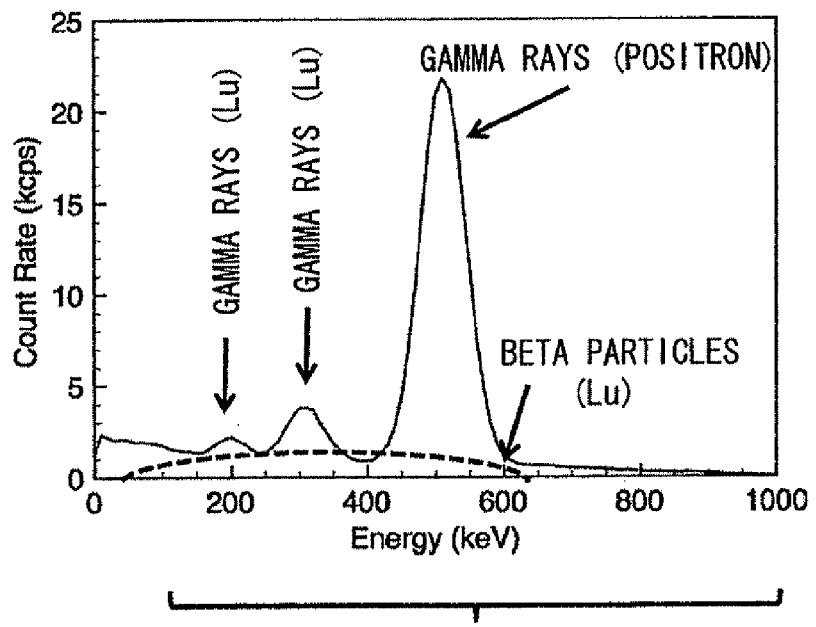
FIGS. 9A and 9B are graphs illustrating energy windows according to the first embodiment of the present invention.

First, regarding the original data as illustrated in FIG. 8A, in step 100 of FIG. 6 and FIG. 7, a coincidence is determined using a wide energy window, for example, from 100 to 1000 keV as illustrated in FIG. 9A. This energy window allows detecting background noise due to intrinsic radioactivity as multiple coincidences, for example, online.

Subsequently, in step 110, the determined multiple coincidences are removed.

Figure 9B:
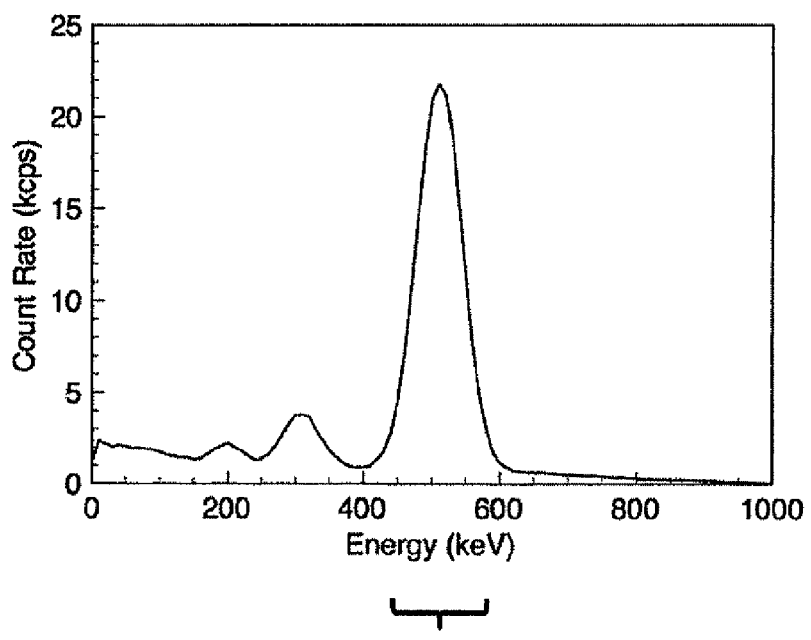

Subsequently, in step 130, an energy window is narrowed to be from 425 to 575 keV as illustrated in FIG. 9B, for example, by off-line. This energy window limits a coincidence event to a photopeak from the positron nuclide only.

Figure 8B:
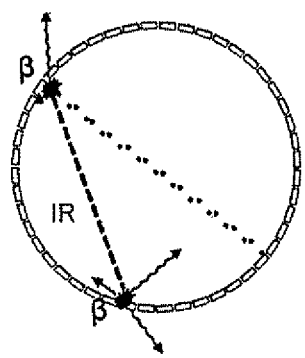
Figure 8B:
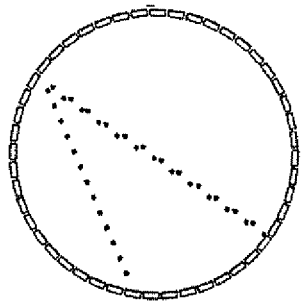
Figure 10:
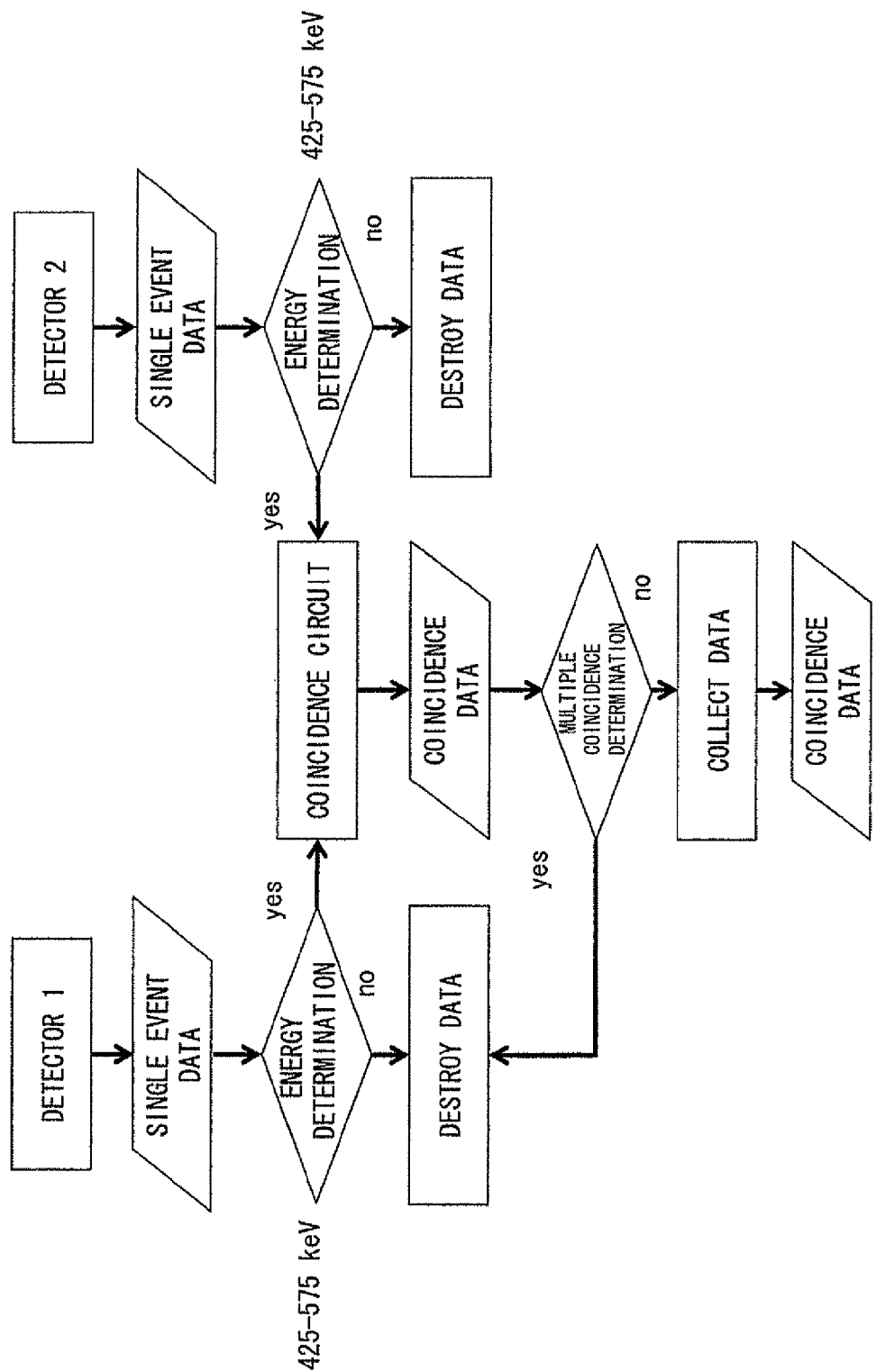
FIG. 10 is a flowchart illustrating an example of a specific procedure according to an existing method.

As exemplarily illustrated in FIG. 10, the existing method narrows the energy window at an initial state to focus on the photopeak of the positron nuclide only. This existing method has difficulty in removal of IR as illustrated in FIG. 8B. In contrast, the present invention removes this IR as illustrated in FIG. 8C.

This process that enlarges and narrows this energy window can be performed simply by changing a setting value of the energy window regarding the same original data in the case where data is collected in the list mode.

Figure 11:
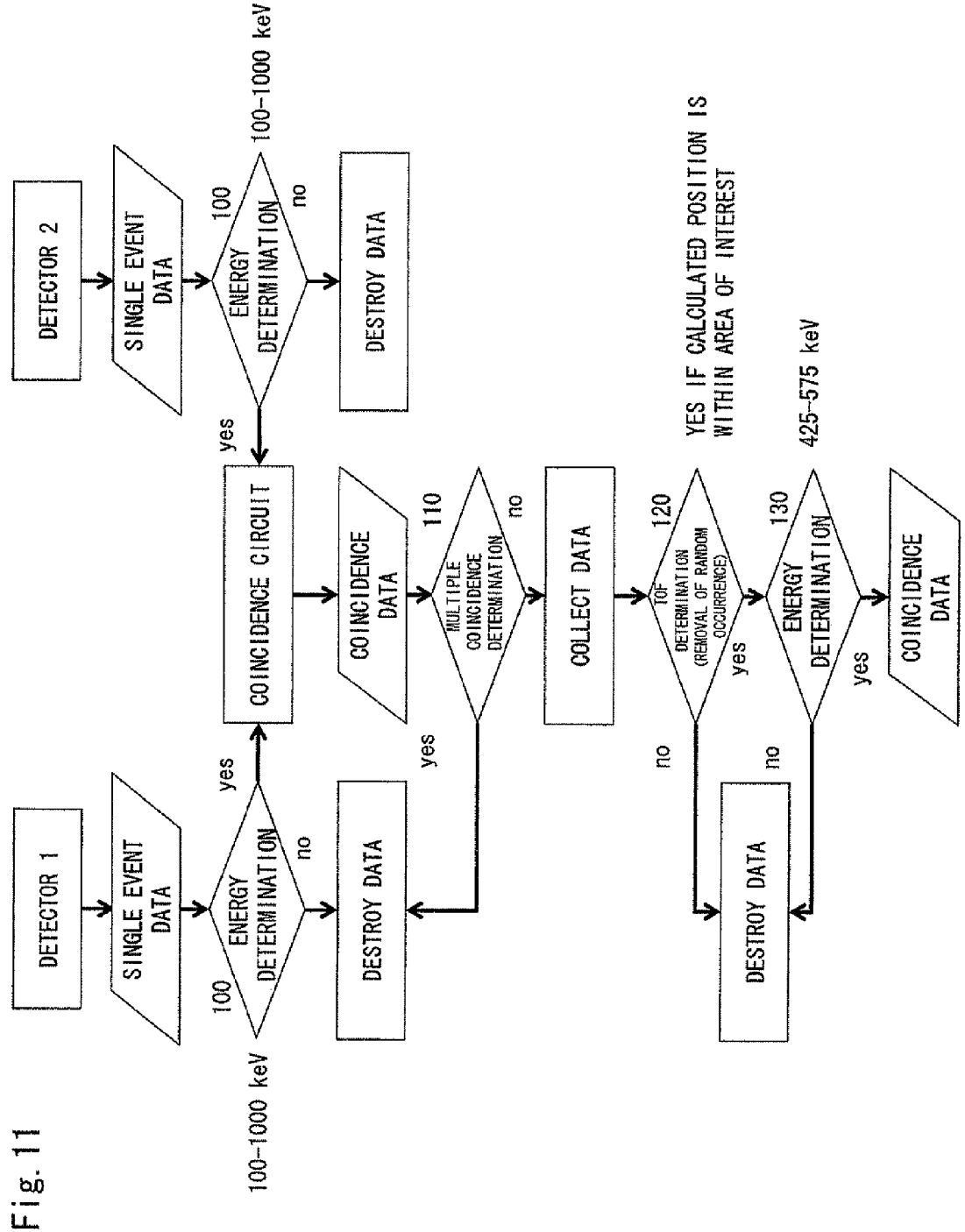
FIG. 11 is a flowchart illustrating a specific procedure according to a second embodiment of the present invention.

Next, a procedure according to a second embodiment of the present invention will be described in FIG. 11. The procedure is a combination of the method of the present invention and a TOF method.

The second embodiment differs from the first embodiment in that step 120 for removing random occurrence by TOF determination is added between multiple simultaneous measurement in step 110 of FIG. 7 and energy determination in step 120.

Working Example

Figure 12:
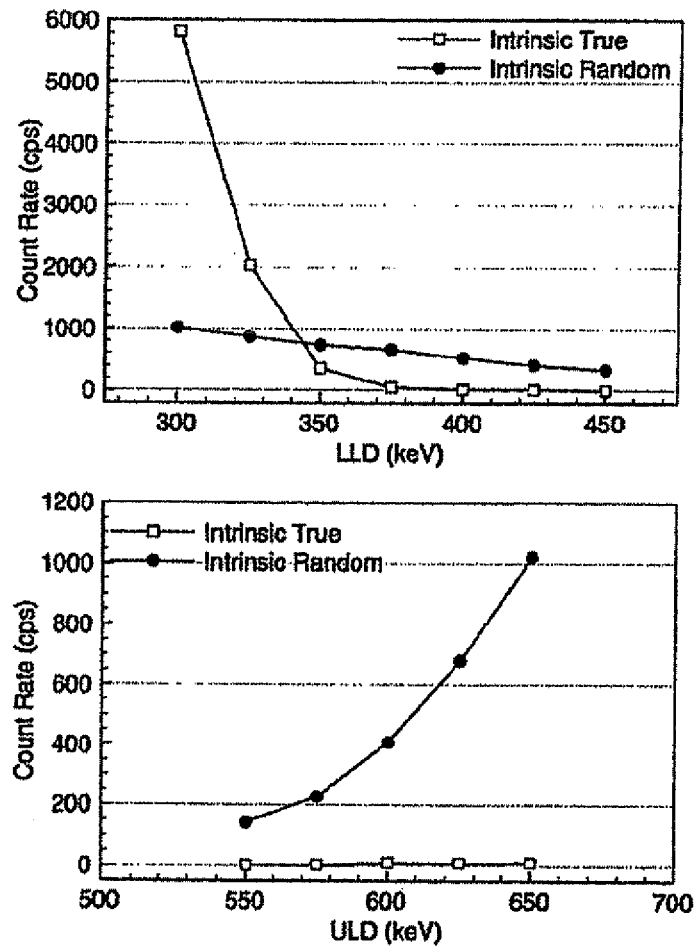
FIG. 12 includes graphs each illustrating a count rate of a noise component in the case where the energy window is varied.

FIG. 12 illustrates count rates of the noise components when the energy window is varied. It was discovered that IT was highly dependent on a lower limit value LLD of the energy window, while IR significantly changes also by an upper limit value ULD of the energy window. Considering energy resolution of 15%, the optimal energy window was set to 425 to 575 keV. It has been found that optimizing the energy window reduces IT to a negligible level while IR cannot be removed by the energy window only.

Figure 13:
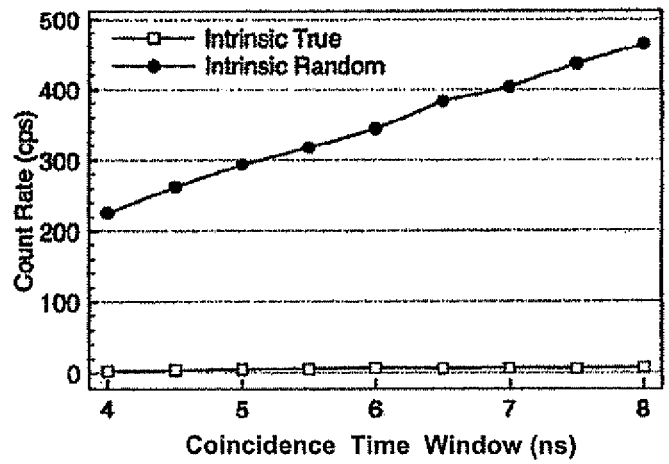
FIG. 13 is a graph illustrating an example of the count rate of the noise component in the case where a coincidence time window is varied.

FIG. 13 illustrates a count rate of the noise component in the case where a coincidence time window is varied. The energy window was set to from 425 to 575 keV. IR increased in proportion to the coincidence time window.

Figure 14:
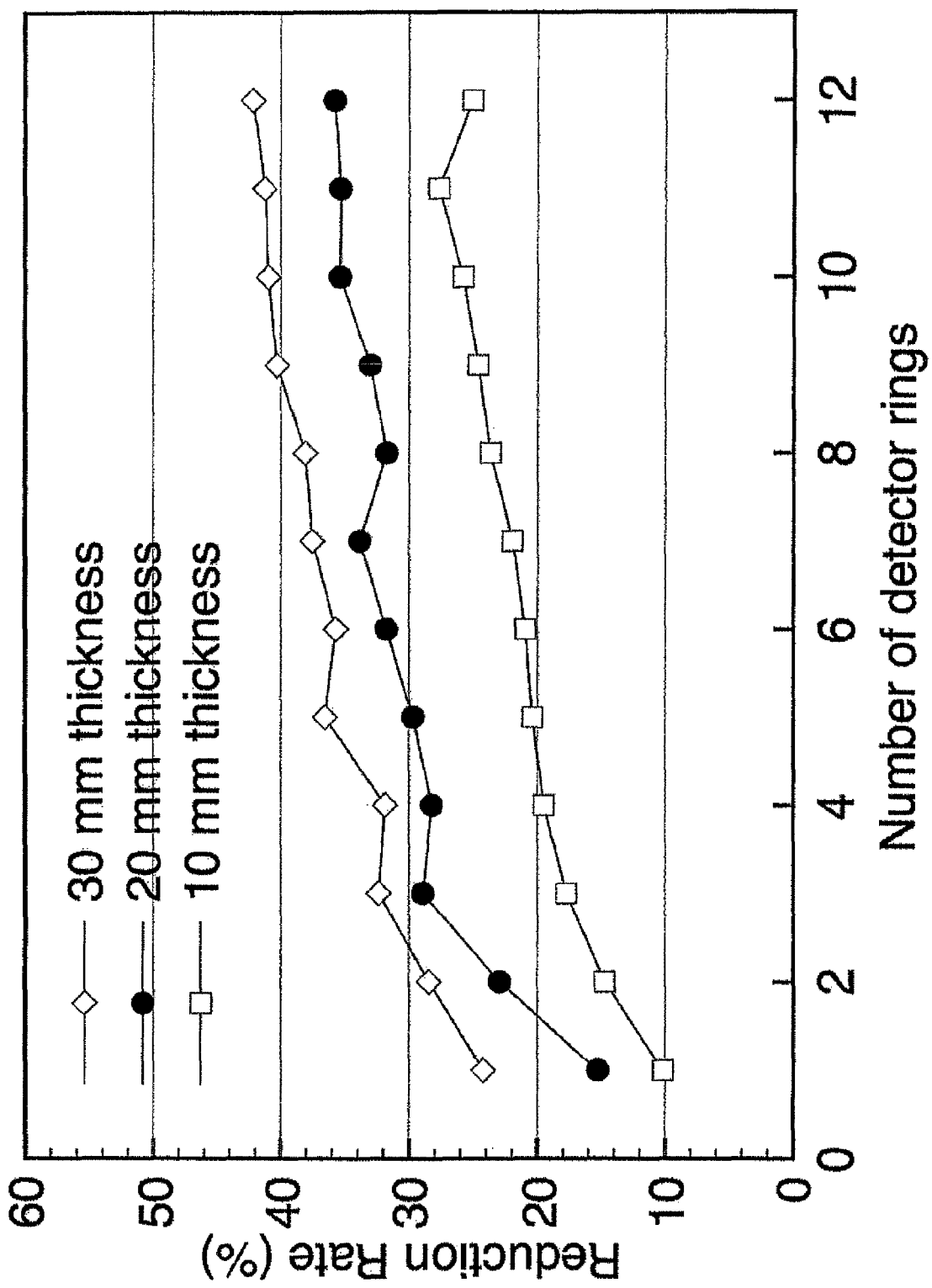
FIG. 14 is a graph illustrating a removal effect of a background component when the number of rings and a thickness of a scintillator are varied.

FIG. 14 illustrates a removal effect of a background component by an MC method of the present invention when the number of the detector rings and a thickness of an LSO scintillator are varied. The reduction rate in the vertical axis denotes a removal rate of background noise. The rate of 100% means complete removal. This trial calculation employs a sight of about 5 cm along the body axis per one detector ring. Since the gamma ray is emitted from Lu-176 in various directions, higher detection efficiency tends to causes multiple coincidences. Accordingly, it has been found that the MC method according to the present invention provides higher performance for removing the background component as the detection efficiency becomes higher.

Figure 15:
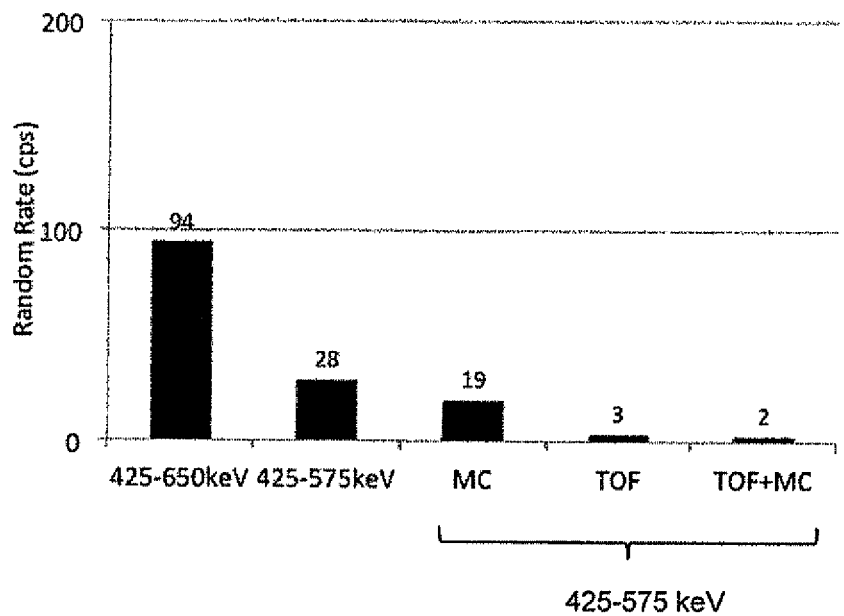
FIGS. 15A and 15B are graphs each illustrating an IR reduction effect according to the present invention.
Figure 15:
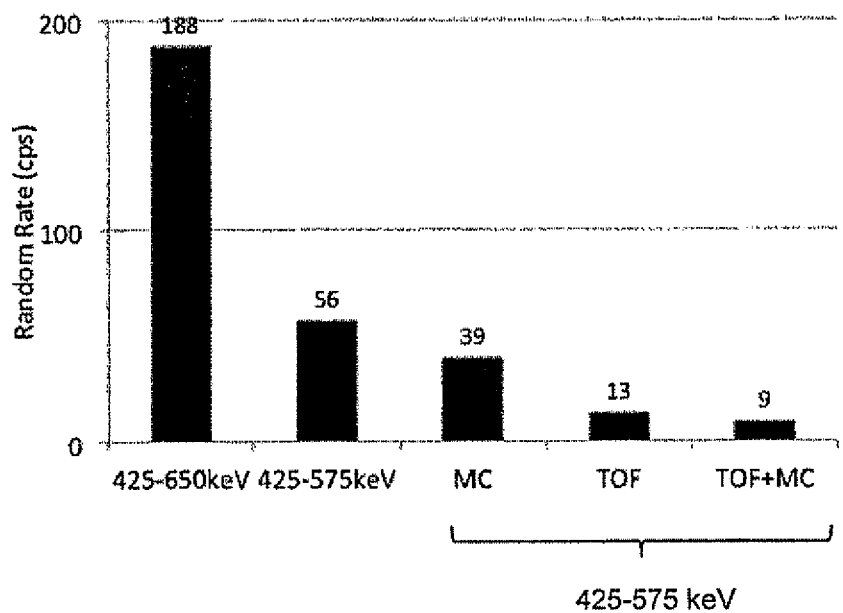

FIGS. 15A and 15B each illustrate an IR reduction effect of the MC method according to the present invention when cylindrical phantoms without radiation distribution are assumed to have diameters of 10 cm and 20 cm. Here, LOR not in contact with the phantom is preliminarily omitted. By limiting ULD to 575 keV with respect to the general energy window of from 425 to 650 keV, IR decreased to one third.

Applying the MC method and the TOF method according to the present invention to an energy window of from 425 to 575 keV respectively reduced by 30% and 80% of IR (the energy window was set to from 100 to 1000 keV when data was collected with the MC method). Additionally, applying both the MC method and the TOF method further reduced IR.

While in the above-described embodiment the present invention is applied to the in-beam PET device where the radiation irradiation device and the PET device are combined, the application object of the present invention is not limited to this. Obviously, the present invention is similarly applicable to a PET device that is combined with a device other than the radiation irradiation device or to a single PET device. Additionally, the PET device is not limited to an open PET device that is an open type.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A coincidence determination method of a PET device configured to use a scintillator of radioactive isotope containing background noise due to intrinsic radioactivity as a radiation detector, the PET device being configured to count a pair of annihilation radiations that is assumed to occur from a same nuclide, the annihilation radiations being detected within a predetermined coincidence time window by a plurality of radiation detectors, the method comprising:
   setting a lower limit value and an upper limit value of a wide energy window, the wide energy window allowing detection of the background noise due to intrinsic radioactivity as multiple coincidences;
   determining a coincidence using the wide energy window;
   removing the multiple coincidences caused by the background noise; and
   limiting a coincidence event to a coincidence event in a photopeak from a positron nuclide only, using a narrow energy window narrower than the wide energy window.

2. The coincidence determination method of the PET device according to claim 1, wherein
   the scintillator is a scintillator that contains Lu radioactive isotope.

3. The coincidence determination method of the PET device according to claim 1, wherein
   the wide energy window is an on-line window, and the narrow energy window is an off-line window.

4. The coincidence determination method of the PET device according to claim 1, wherein
   the narrow energy window is within an energy distribution at a photopeak.

5. The coincidence determination method of the PET device according to claim 1, wherein
the wide energy window has a lower limit value and an upper limit value that can be sensed by the detector.

6. The coincidence determination method of the PET device according to claim 1, wherein
   a process with the wide energy window and a process with the narrow energy window are performed on a same list mode data.

7. The coincidence determination method of the PET device according to claim 1, wherein
   the wide energy window is an energy window allowing simultaneous detection of beta particles at a mean energy of 420 keV and gamma rays at 307 keV, 202 keV, and 88 keV, the beta particles and the gamma rays being emitted from the radioactive isotope of Lu-176.

8. A coincidence determination apparatus of a PET device comprising:
   a PET device configured to use a scintillator of radioactive isotope containing background noise due to intrinsic radioactivity as a radiation detector;
   a determination unit configured to determine a coincidence using a wide energy window,
   a setting unit configured to set a lower limit value and an upper limit value of the wide energy window, the wide energy window allowing detection of the background noise due to intrinsic radioactivity as multiple coincidences when pairs of annihilation radiations assumed to occur from a same nuclide are counted, the annihilation radiations being detected within a predetermined coincidence time window by a plurality of radiation detectors;
   a removal unit configured to remove the multiple coincidences caused by the background noise; and
   a limiting unit configured to use a narrow energy window narrower than the wide energy window to limit a coincidence event to a coincidence event in a photopeak from a positron nuclide only.

9. The coincidence determination apparatus of the PET device according to claim 8, wherein
   the scintillator is a scintillator that contains Lu radioactive isotope.

10. The coincidence determination apparatus of the PET device according to claim 8, wherein
    the wide energy window is an on-line window, and the narrow energy window is an off-line window.

11. The coincidence determination apparatus of the PET device according to claim 8, wherein
    the narrow energy window is within an energy distribution at a photopeak.

12. The coincidence determination apparatus of the PET device according to claim 8, wherein
    the wide energy window has a lower limit value and an upper limit value that can be sensed by the detector.

13. The coincidence determination method of the PET device according to claim 8, wherein
    the wide energy window is an energy window allowing simultaneous detection of beta particles at a mean energy of 420 keV and gamma rays at 307 keV, 202 keV, and 88 keV, the beta particles and the gamma rays being emitted from the radioactive isotope of Lu-176.

* * * * *